(12) United States Patent
Kasai et al.

(10) Patent No.: US 6,196,063 B1
(45) Date of Patent: Mar. 6, 2001

(54) METHOD AND APPARATUS FOR MEASURING PISTON RING TENSION

(75) Inventors: Yasuo Kasai, Takanezawa-machi (JP); Yukio Inoue, Dublin, OH (US); Tim Harris, Springfield, OH (US); Naoki Ebisui, Columbus, OH (US); Eric Ellington, Marysville, OH (US)

(73) Assignee: Honda Giken Hogyo Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/088,802

(22) Filed: Jun. 2, 1998

(51) Int. Cl.[7] .................................................. G01M 15/00
(52) U.S. Cl. ................................. 73/120; 33/605
(58) Field of Search ..................... 73/116, 119 R, 73/120; 33/605

(56) References Cited

U.S. PATENT DOCUMENTS 3,946,602 * 3/1976 Huntington et al. .................... 73/120
5,974,871 * 11/1999 Kanda et al. ........................... 73/120

FOREIGN PATENT DOCUMENTS 619299 3/1994 (JP) .

OTHER PUBLICATIONS

Description of RIKEN Tangential Tension Tester (no date).

* cited by examiner

*Primary Examiner*—Eric S. McCall
(74) *Attorney, Agent, or Firm*—Carrier, Blackman & Associates, P.C.; Joseph P. Carrier; William D. Blackman (57) ABSTRACT

An apparatus for measuring tension of piston rings includes a cylindrical support fixture having a circumferential groove formed therearound for receiving and holding a piston ring. A rigid base supports a plurality of components of the apparatus. A strong, thin band, formed from a material sufficiently strong to withstand repeated applications of pulling force thereto, is mounted to the base, and is held between two clamps. The band has a loop formed therein, for receiving the support fixture with a piston ring mounted therein. The apparatus also includes reciprocally movable structure for tightening the band around the support fixture, such as a slidably movable clamp assembly at one end of the band. The apparatus further includes mechanism for measuring tension on the band, and fluid activatable mechanism for vertically reciprocating a portion of the support fixture. In a preferred embodiment, the reciprocating mechanism is pneumatically activatable, such as by compressed air.

21 Claims, 4 Drawing Sheets

METHOD AND APPARATUS FOR MEASURING PISTON RING TENSION

BACKGROUND OF THE INVENTION

1. Field of the invention

The present invention relates to a method and apparatus for automated measurement of piston ring tension. More particularly, the present invention relates to a method and apparatus for compressing a piston ring in a measuring fixture, with a thin high-strength band, and measuring the force exerted on the band, by the outwardly expanding ring. Even more particularly, the present invention relates to a method and apparatus of the type described, in which a portion of the fixture and piston ring are vertically reciprocated, in order to help remove any looseness from the band, caused by friction between the piston ring and the compression band, before measurement takes place.

2. Description of the Background Art

A manually operated method of measuring piston ring tension has been known for many years, in which a steel band is formed into a loop which is wrapped around a piston ring to be measured. The band is then placed under tension by pulling on a handle which is attached to one end of the band, the other end of the band being clamped in place. In this known design, the base of the handle is pivotally anchored to a support. A spring-actuated load gauge is connected to the steel band, between the handle and the loop which surrounds the piston ring, and the tension of the ring may be read directly off of the load gauge. This early method and apparatus suffered from problems with consistency and reproducibility.

Some later known devices exist for compressively measuring piston ring tension. Two such known devices are described in U.S. Pat. Nos. 3,946,602 and 4,249,415.

Figure 1:
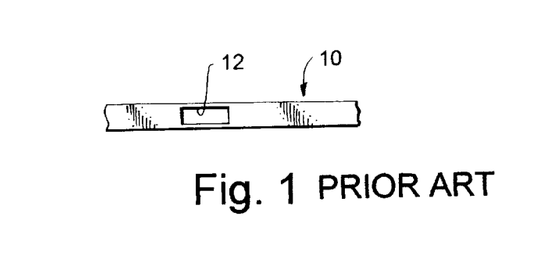
FIG. 1 is a side elevational view, partially cut away, of a prior art steel band usable in a piston ring tension measuring apparatus.
Figure 2:
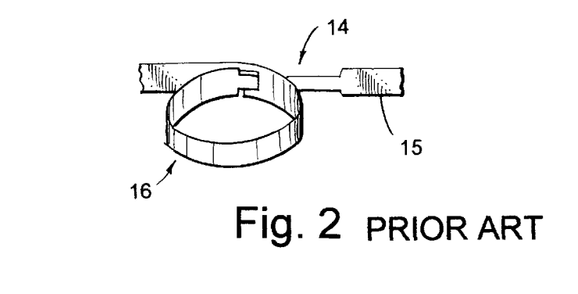
FIG. 2 is a perspective view of the prior art steel band of FIG. 1, wrapped around in a loop configuration.
Figures 3, 6:
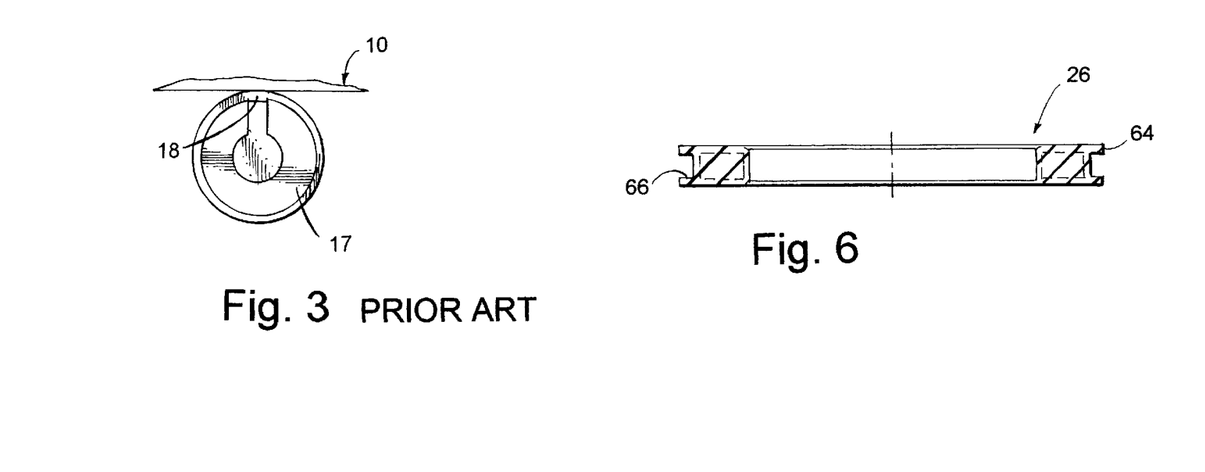
FIG. 3 is a top plan view of the prior art steel band of FIGS. 1–2, wrapped around a cylindrical fixture holding a piston ring therein.
FIG. 6 is a cross-sectional view of the groove gauge fixture of FIG. 4.

Certain aspects of this type of apparatus have become relatively standardized. Referring now to FIGS. 1–3, a steel band 10 is shown having a rectangular hole 12 formed therein. The band 10 also includes a narrowed diameter portion 14, and in order to form the band into a loop, a first end 15 of the band 10 is turned sideways, passed through the hole 12 in the band, and then straightened up as shown in FIG. 2. After passing the first end 15 of the band through the hole 12, the band 10 includes an integral loop 16 therein, with an adjustable size range which is determined by the length and spacing of the narrrowed diameter portion 14 in relation to the rectangular hole 12.

Referring now to FIG. 3, the band 10 is shown wrapped around a cylindrical fixture 17 having a horizontally oriented circumferential groove formed therearound, which receives a piston ring 18 therein. The fixture 17 is provided to hold and stabilize a piston ring 18 during testing thereof. The same fixture 17 is used over and over again, to test many different piston rings.

Often, a standardized master ring is used which exhibits a known and calibrated diameter. The master ring is used as a comparison device, to ensure that a piston ring measuring apparatus is set correctly. Where used, the master ring is checked first, and the machine readouts are adjusted, if necessary, to show the known tension thereof. Then, an unknown ring is tested.

A common problem has been encountered with this band type of device, in that when a fixture 17 and piston ring 18 is placed into a loop 16 of the band 10, and tension on the band 10 is increased, the band will not tighten down on the fixture and ring in a consistent and reprodudcible manner, unless the fixture and ring assembly is repeatedly tapped against a table top, or other work surface, as the band 10 is tightened therearound, to ensure that no looseness caused by friction remains in the loop 16. Where the band 10 is placed under tension without tapping the fixture and ring against a work surface, test results tend to vary with a single piston ring from test to test, instead of being reliable and reproducible. Accordingly, a step of tapping the fixture and ring assembly against a table or other support, as the band 10 tightens therearound, became a necessary part of the normal process of piston ring tension measurement.

Unfortunately, the tapping procedure of a given machine operator might be different from one day to the next, as well as different from the tapping procedure of another operator using the same machine, perhaps on a later work shift. Because of this above-described variability in test procedure, efforts began to be made to standardize the tapping operation as a part of piston ring tension measurement.

A recent design for an apparatus which may be used to measure piston ring tension is described in Japanese laid-open Patent number 6-19299, published Oct. 8, 1996, naming Hattori as the inventor. The disclosure of Japanese laid-open Patent number 6-19299 is herein incorporated by reference. In the apparatus of Hattori, a number of components are mounted on a rigid base, including a horizontally reciprocally movable first clamp coupled to an electronic load cell. The first clamp holds a first end of a steel band which is formed into a loop, and a horizontally reciprocally movable second clamp holds a second end of the steel band. The steel band encircles a piston ring to be measured. The piston ring rests on a carrying stand, which is separate from the base. The second clamp is attached to an electronic length measuring device, as well as to the band.

In order to make sure that looseness caused by friction in the band is removed in a consistent and reproducible fashion, before tension in the piston ring is measured, the apparatus of Hattori also includes a vertically reciprocally movable vibration plate, which is located in between the piston ring and the carrying stand. The vibration plate is free at a first end thereof, and is pivotally attached to the carrying stand at a second end thereof. An electric motor is horizontally mounted below the base, and the motor rotatably drives an eccentric cam, to alternately lift the free end of the vibration plate and drop it against the carrying stand. After any looseness caused by friction has been taken out of the band by reciprocal movement of the first and second clamps, acting in conjunction with the above-described movement of the vibration plate, the tension of the piston ring may be measured by the load cell, in conjunction with the electronic length measuring device.

Although the method and apparatus of Hattori is useful, and advanced the known state of the art at the time it was published, Hattori's use of an electric motor and eccentric cam to actuate the mechanical vibration plate is subject to wear and tear, and these components may fail after some time in service. It would be advantageous if a method and apparatus could be provided for measuring piston ring tension, which replaced the vibration plate, electric motor and eccentric cam of the Hattori apparatus with a more reliable means of vertically reciprocating a section of a piston ring, in a measuring device, which would not be as prone to mechanical breakdown.

A need still exists in the art for an improved method and apparatus for measuring piston ring tension, which does not have the shortcomings of the apparatus according to the design of Hattori.

SUMMARY OF THE INVENTION

An improved method and apparatus for measuring piston ring tension includes a rigid base which supports a plurality of other components of the apparatus. A preferred apparatus for measuring tension of piston rings includes a strong, thin band, formed from a material sufficiently strong to withstand repeated applications of pulling force thereto, which is mounted to the base, and is held between two clamps. The band has a loop formed therein, for receiving a support fixture, with a piston ring mounted therein. The apparatus hereof, optionally, may include a cylindrical support fixture having a circumferential groove formed therearound for receiving and holding a piston ring. Preferably, the apparatus also includes horizontally reciprocally movable means for tightening the band around the support fixture, such as a slidably movable clamp assembly at one end of the band. The apparatus further includes means for measuring tension on the band, and fluid activatable means for vertically reciprocating a portion of the support fixture. In a most preferred embodiment of the present invention, the reciprocating means is pneumatically activatable, such as by compressed air.

Accordingly, it is an object of the present invention to provide an improved method and apparatus for measuring piston ring tension, which includes a superior means for vertically reciprocating a portion of the support fixture. It is another object of the present invention to provide an apparatus for measuring piston ring tension which will give consistently reproducible readings. For a more complete understanding of the present invention, the reader is referred to the following detailed description section, which should be read in conjunction with the accompanying drawings. Throughout the following detailed description and in the drawings, like numbers refer to like parts.

DETAILED DESCRIPTION OF THE PREFERRED EMBODIMENT

Figure 4:
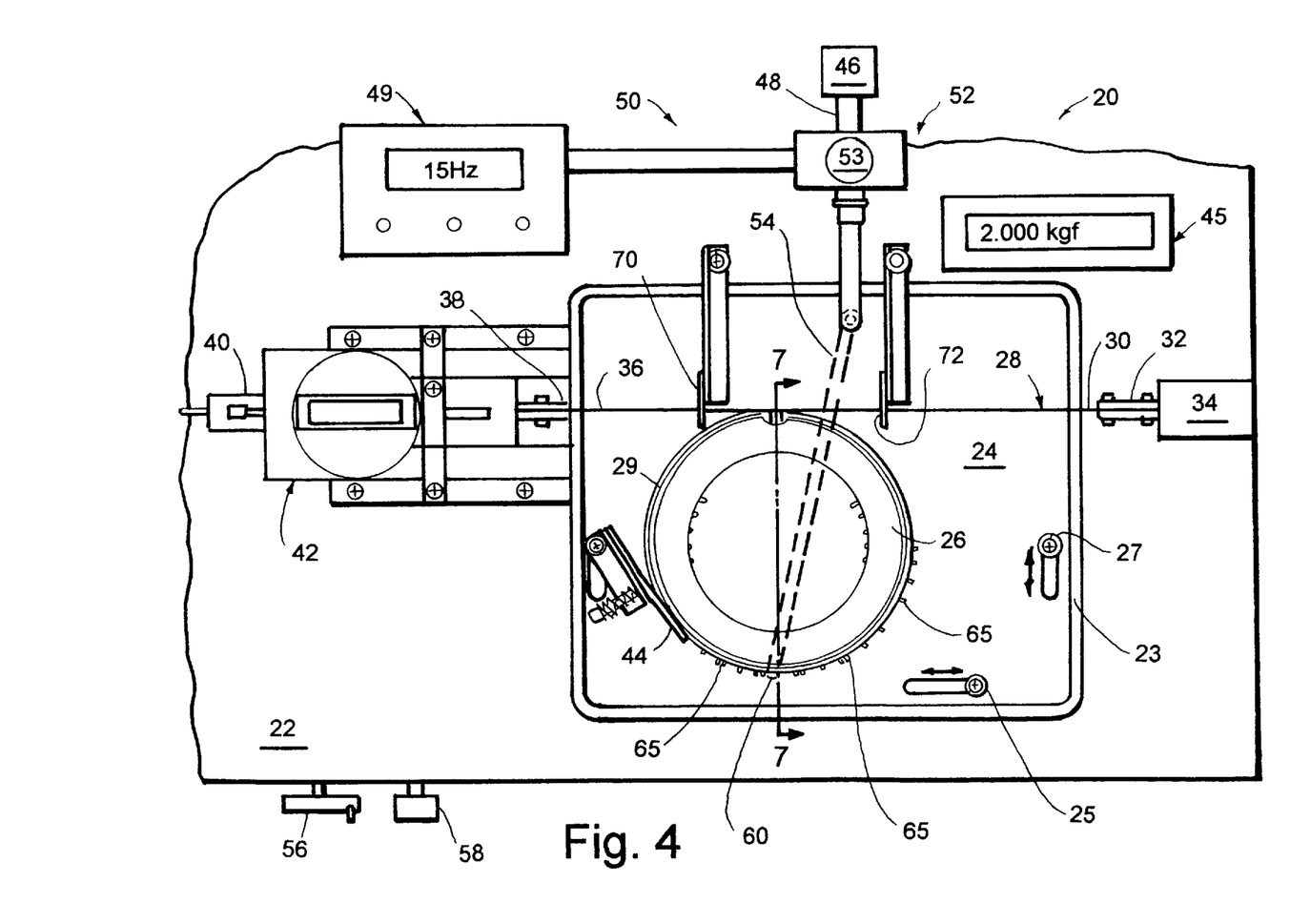
FIG. 4 is a top plan view, partially cut away, of a piston ring tension measuring apparatus in accordance with a first embodiment of the present invention.

Referring now to FIG. 4, an apparatus for measuring piston ring tension, in accordance with the present invention, is shown generally at 20. The apparatus 20, generally, includes the following main components which will be discussed in further detail below: a base 22, a work support plate 24, a groove gauge fixture 26, a steel band 28, length and tension measuring devices 42, 45, respectively, and an air delivery system 50.

The base 22 is preferably formed from a strong, rigid material such as cast iron. The base 22 has a generally flat upper surface which supports multiple components of the apparatus 20 thereon. A work support plate 24 is adjustably mounted to the base 22, for supporting a groove gauge fixture 26 and a steel band 28 thereon. An open space 23 is provided around the work support plate 24 to allow adjustment thereof, in order to accommodate piston rings of different diameters. First and second locking members 25, 27 are provided for releasably fixing the position of the support plate 24 on the base 22. An alignment tab 44 is adjustably mounted to the support plate 24. The alignment tab 44 is preferably used as a rough guide to help guide an operator of the apparatus, in lining up the groove gauge fixture 26 on the support plate 24, but the alignment tab 44 does not contact the band 28, or the groove gauge fixture 26, during actual testing.

The steel band 28 is substantially similar to the band 10 shown and described in connection with FIGS. 1–3, and includes an integral loop 29 therein. The steel band 28 is held at a first end 30 thereof by a first clamp 32, which is reciprocally movable by a first reciprocating means 34. The first reciprocating means 34 can be a conventional reciprocating means such as, e.g., a motor-driven cam arrangement, and acts to move the first end 30 of the band 28 linearly horizontally back and forth, in the direction of the band, exclusive of the loop.

The steel band 28 is further held at a second end 36 thereof by a second clamp 38, which may also be reciprocally movable by a second reciprocating means 40. The second reciprocating means 40, where used, can also be a conventional reciprocating means such as, e.g., a motor-driven cam arrangement, and acts to move the second end 36 of the band 28 linearly horizontally back and forth, in the direction of the band, exclusive of the loop 29. In a preferred embodiment of the apparatus 20 hereof, the first and second reciprocating means are synchronized to move in opposed directions, so that they are both putting the band 28 under tension, from opposite directions, at the same time. This opposed reciprocating movement acts to help remove any slack from the loop 29, where it surrounds the groove gauge fixture 26. The second clamp 38 is attached to a length measuring device 42.

A tension measuring apparatus 45 is also provided to measure tension on the band 28. A coarse adjustment wheel 56 and a fine adjustment knob 58 are also provided attached to the base 22, and are operatively connected to the band 28, for setting the tension thereon.

AIR DELIVERY SYSTEM

The air delivery system 50 provides an intermittent supply of compressed air to an outlet nozzle 60 located in the work support plate 24 adjacent the edge of the loop 29 in the steel band 28, when the apparatus 20 hereof is connected to a supply of shop air.

An air fitting 46 is provided, at the exterior of the apparatus 20, for connecting the apparatus to a source of shop air, preferably regulated to about 70–100 psi, most preferably about 85 psi. The air fitting 46 is preferred to be of the quick disconnect type. The air fitting 46 is in fluid communication with an air delivery line 48, for providing compressed air to the apparatus 20.

A valve 52 is provided in the air delivery line 48 for selectively and intermittently interrupting the flow of air therethrough. The valve 52 includes an electrically operable solenoid 53 in the preferred embodiment of the present invention. An electronic controller 49 is also provided as a part of the air delivery system 50, and is electrically connected to the valve 52 for regulating the cycling speed thereof. The valve is operable to intermittently interrupt the flow of air to the nozzle 60 in the support plate 24.

After the valve 52, the air delivery line 48 feeds into, and is in fluid communication with a hollow bore 54 formed in the support plate 24. The hollow bore 54 connects the air delivery line 48 to the nozzle 60. The nozzle 60 provides an air outlet to the apparatus 20. The nozzle may be formed as a slot, and is preferred to be located so as to not be completely covered, by the groove gauge fixture 26, as this could lead to a partial vacuum being created in the air delivery system 50 at certain times and under certain conditions, such as, for example, after the apparatus 20 was shut off. The nozzle 60 in one embodiment, may be about 1–2 mm across.

THE GROOVE GAUGE FIXTURE

Figure 5:
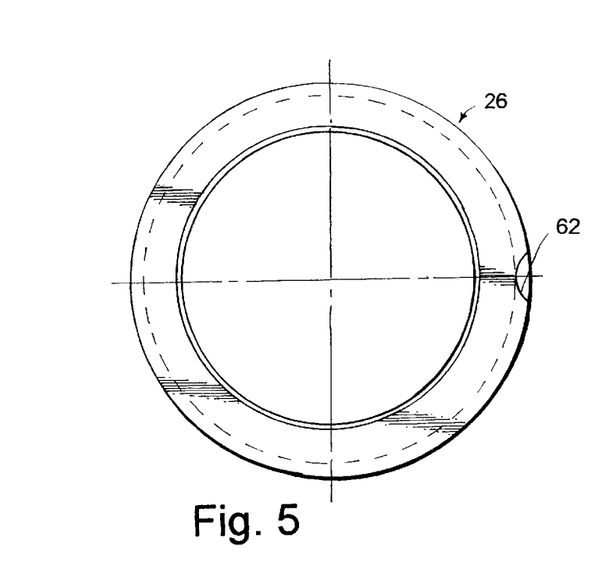
FIG. 5 is a top plan view of a groove gauge fixture, usable in conjunction with the apparatus of FIG. 4, in accordance with the present invention.
Figure 7A:
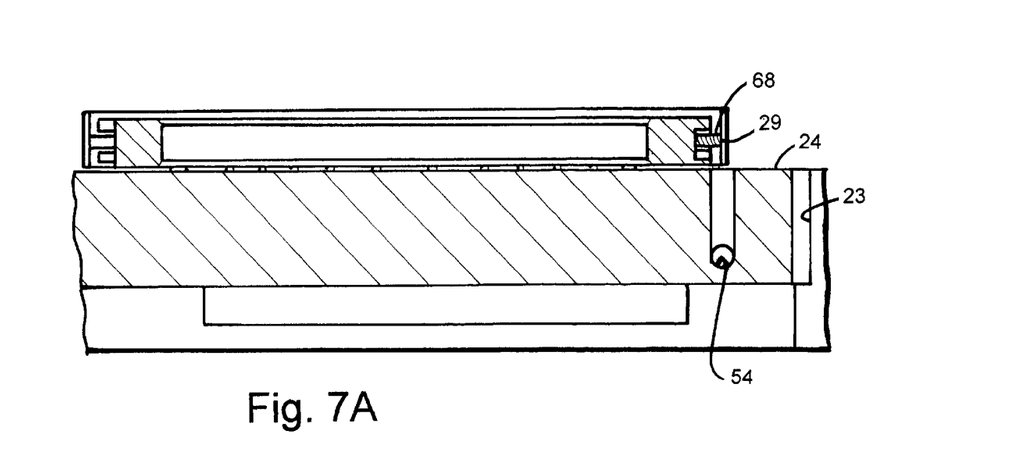
FIGS. 7A and 7B are sequential cross-sectional sequential views of a portion of the apparatus of FIG. 4 during operation thereof, taken along the line 7—7 in FIG. 4.
Figure 7B:
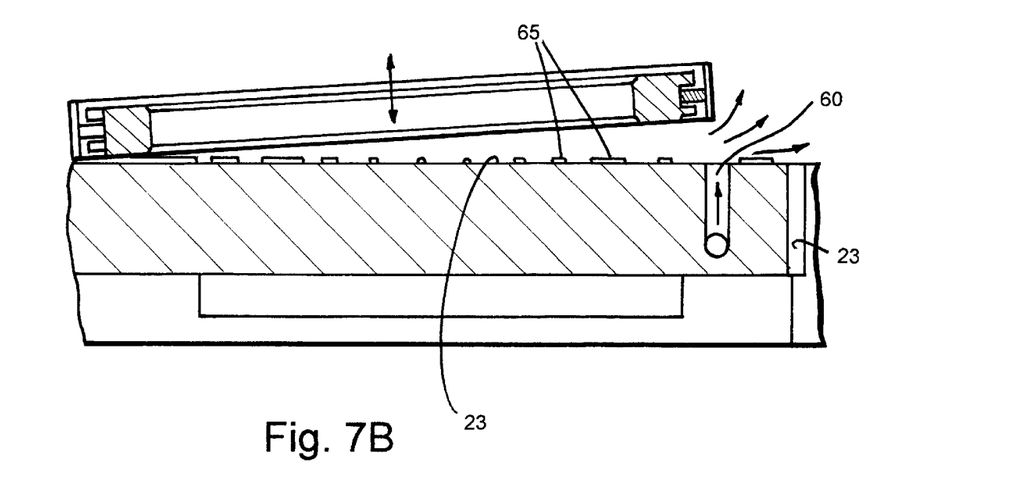

Referring now to FIGS. 5–7, the groove gauge fixture 26 which is usable with, or as a part of, the present invention is generally formed as a hollow disc having a cut out arcuate notch 62 formed in one side thereof. The groove gauge fixture 26 has a peripheral exterior side edge 64 with a circumferential groove 66 formed therein, which passes completely around the outside of the groove gauge fixture, as shown in phantom in FIG. 5. The circumferential groove 66 is provided for supportably receiving a piston ring 68 therein (FIGS. 7A–7B) during a testing operation.

METHOD OF OPERATION

In use, a master piston ring, having a known diameter, is tested first to calibrate the apparatus. Shop air, at about 85 psi, is connected to the inlet fitting 46. The ring is installed into the groove of the groove gauge fixture 26, and rotated until the gap in the ring is aligned with the notch 62 in the groove gauge, as shown in FIG. 4. The groove gauge fixture 26, with the ring 68 in place thereon, is then manually placed into the loop 29 on top of the work support plate 24, using the alignment tab 44 as a rough guide where to place the groove guage. It has been found helpful, in the practice of the present invention, to have high spots 65 placed on the work support plate 24 to avoid excessive contact between the lower surface of the groove gauge and the upper surface of the work support plate. These high spots 65 may be painted on. It will be seen from the foregoing that the high spots 65 provide a spacer means, between the rigid base and the support fixture, for creating a small gap when the groove gauge fixture 26 is resting on the rigid base defined by the work support plate 24.

The apparatus is then turned on, to activate the valve 52 to begin providing an intermittent supply of compressed air through the bore 54 and out of the nozzle 60. The rate of pulsation of the compressed air supply is controlled by the electronic controller 49 signaling the solenoid 53 when to open and close. The rate of pulsation is preferably in a range of 5–15 Hz, preferably 6–12 Hz, and most preferably 8–10 Hz.

This pulsating supply of air moves the edge of the groove gauge fixture, adjacent the nozzle 60, up and down in a vertical reciprocal movement, as shown by the two-headed arrow in FIG. 7B. Air being expelled from the nozzle 60 pushes on, and lifts the fixture, ring, and band loop 29 as a unit, on the side of the loop proximate the nozzle 60, as shown in FIG. 7B. It is expected that the edge of the fixture 26 may be raised approximately ⅛ inch to ¼ inch off of the work support plate 24. As gravity moves the groove gauge fixture downwardly into contact with the work support plate 24 in between puffs of air, the groove gauge taps against the work support plate 24 in a completely consistent and reproducible manner. Used in conjunction with the reciprocating movement of the band clamps 32, 38, this repeated tapping helps to remove any looseness caused by friction from the loop 29 in the band 28, so that the loop 29 is in close contact with the piston ring 68 at all points therearound.

When the apparatus 20 is turned on, the reciprocating means 34, 40 also begin moving the first and second clamps 32, 38 alternately toward and away from each other, to remove looseness caused by friction from the loop 29 in the band 28. Then, after all looseness caused by friction is removed from the loop 29, the valve 52 is closed to shut off the supply of air through the nozzle 60, and the reciprocating means 34, 40 is also shut off, to create a steady state condition in the band 28. Then, the tension on the band 28 is adjusted, by turning the adjustment handles 56, 58, until a predetermined band length is obtained between two reference points 70, 72, as indicated on the length measuring device 42. This predetermined band length should correspond to a known measurable gap in the piston ring 68. When the predetermined band length is reached, a reading can be taken from the tension measuring device 45. When using the master ring, the reading on the tension measuring device 45, at this stage, should be a predictable and constant value such as the 2.000 kgf shown on the readout of the tension measuring device in FIG. 4. If the reading varies from the expected value, the readout of the tension measuring device 45 may be adjusted to the expected value.

After reading the master ring, an unknown ring may then be substituted into the groove gauge fixture, and the process repeated until a reading on the tension measuring device is obtained for the unknown ring, at the same predetermined band length.

ALTERNATIVE EMBODIMENT

Figure 8A:
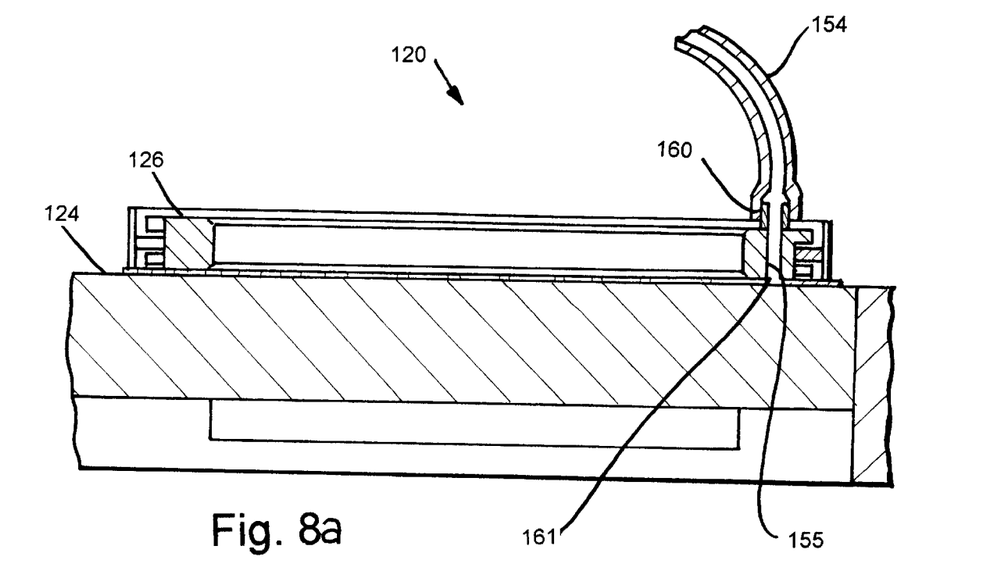
FIGS. 8A and 8B are sequential cross-sectional sequential views, similar to FIGS. 7A and 7B, of a portion of a modified apparatus according to a second embodiment of the present invention, during operation thereof.
Figure 8B:
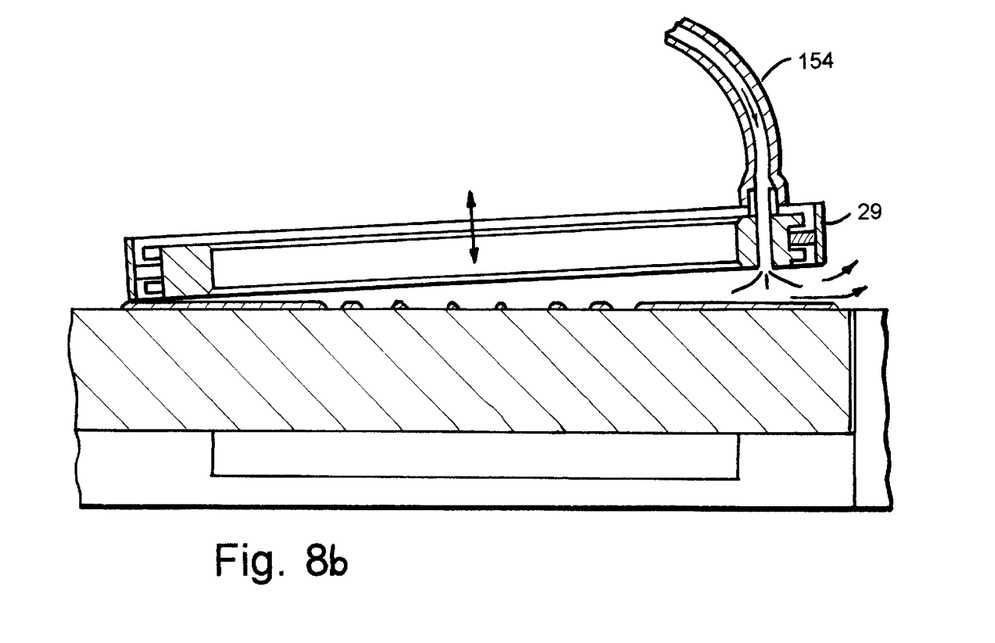

Referring now to FIGS. 8A and 8B, an alternative embodiment of an apparatus 120, in accordance with the present invention, is shown. The apparatus 120 in this second embodiment is substantially identical to that shown and described herein with respect to the apparatus 20 according to the present invention, except that in this second embodiment, instead of the bore 54 being formed through the work support plate and communicating with the nozzle 60, as in the first embodiment, a flexible hose 154 connects the air delivery line 48, downstream of the valve 52, to the top of the groove gauge fixture 126.

In this embodiment, the groove gauge fixture 126 has a hollow vertical bore 155 formed therethrough, and a small cylindrical tube 160 is welded on to, or otherwise fixedly attached to, the top of the groove gauge fixture 126, adjacent the vertical bore 155 and in fluid communication therewith. The flexible hose 154 fits sealingly over the cylindrical tube 160, to intermittently provide pulses of air from the air delivery system to the vertical bore 155 of the groove gauge fixture 126.

As seen from a comparison of FIGS. 8A and 8B, when air under pressure is supplied to the vertical bore 155, it passes outwardly from an outlet aperture 161 at the bottom of the vertical bore 155, beneath the groove gauge fixture 126. This outwardly expelled air pulse pushes the edge of the groove gauge fixture, on the right side in the drawing, upwardly away from the work support plate 124 from about 1/8 inch to about 1/4 inch. When air stops flowing through the hose 154 and the vertical bore 155, the groove gauge fixture falls, under its own weight, back into contact with the work support plate 124. When the groove gauge fixture contacts the work support plate 124, it creates a tapping action which helps to remove looseness caused by friction from the band loop 29.

Although the present invention has been described herein with respect to specific preferred embodiments thereof, the foregoing description is intended to be illustrative, and not restrictive. Those skilled in the art will realize that many equivalent modifications of the preferred embodiments could be made which would be operable. All such modifications, which are within the scope of the claims, are intended to be within the scope and spirit of the present invention.

What is claimed is:

1. An apparatus for measuring piston ring tension, comprising:
   a rigid base;
   a support fixture for holding a piston ring;
   a band mounted to the base, said band having a loop formed therein and being formed from a material sufficiently strong to withstand repeated applications of pulling force thereto;
   horizontally reciprocally movable means for tightening the band around the support fixture;
   means for measuring tension of the band; and
   means for vertically reciprocating a portion of the support fixture relative to said rigid base, including a medium delivery system for discharging a medium near said portion of said support fixture such that the medium contacts the portion and moves the portion away from said base.

2. The apparatus of claim 1, wherein said delivery system of the vertically reciprocating means is pneumatic.

3. The apparatus of claim 1, wherein said delivery system comprises an air supply system which comprises:
   an air supply line;
   a discharge nozzle opening near said portion of the support fixture; and
   means for selectively interrupting air flow through said air supply line.

4. The apparatus of claim 3, further comprising variably adjustable control means for setting a rate of operation of said interrupting means.

5. The apparatus of claim 4, wherein the means for interrupting comprises an electrically actuatable solenoid valve.

6. The apparatus of claim 1, wherein said rigid base comprises a work support plate having an upper surface supporting said support fixture thereon, said work support plate having a hollow bore formed therethrough which terminates at an outlet formed in said upper surface thereof, said outlet facing said portion of the support fixture;
   and wherein said means for vertically reciprocating is operable to intermittently send pulses of said medium from said delivery system into and through said bore in said work support plate at a predetermined rate.

7. The apparatus of claim 6, wherein the delivery system is pneumatically activatable.

8. The apparatus of claim 7, wherein said delivery system comprises an air supply system which comprises:
   an air supply line;
   a discharge nozzle at said outlet facing said portion of the support fixture; and
   means for selectively interrupting air flow through said air supply line.

9. The apparatus of claim 8, further comprising variably adjustable control means for setting a rate of operation of said interrupting means.

10. The apparatus of claim 9, wherein the means for interrupting comprises an electrically actuatable solenoid valve.

11. The apparatus of claim 1, wherein said rigid base supports said support fixture thereon:
    said support fixture has a hollow bore formed therethrough which terminates at an outlet formed in a lower surface of said support fixture, said outlet facing said rigid base;
    and wherein said means for vertically reciprocating is operable to intermittently send pulses of said medium from said delivery system into and through said hollow bore in said support fixture.

12. The apparatus of claim 11, wherein said delivery system comprises:
    a delivery line;
    means operatively associated with said delivery line for interrupting flow therethrough; and
    a flexible hose connecting said delivery line with said hollow bore of said support fixture.

13. An apparatus for use in conjunction with a fixture having a flattened lower surface to vertically reciprocate a portion of said fixture, comprising:
    a support base;
    a band mounted to the base, said band having a loop formed therein for receiving a fixture having a flattened lower surface, said band being formed from a material sufficiently strong to withstand repeated applications of pulling force thereto; and
    a delivery system, comprising:
       a delivery line for delivering a medium;
       an outlet in communication with said delivery line and opening near a portion of said loop for discharging a medium to contact said portion of said fixture when the fixture is received in said loop so that the portion will move away from said support base; and
       means for selectively intermittently interrupting flow of said medium through said delivery line.

14. The apparatus of claim 13, further comprising variably adjustable control means for setting a rate of operation of said interrupting means.

15. The apparatus of claim 14, wherein the means for interrupting comprises an electrically actuatable solenoid valve.

16. A method of removing looseness from a metal band during a process of measuring piston ring tension, comprising the steps of:
    a) placing a piston ring into a groove formed around a support fixture having a flattened lower surface;
    b) placing said support fixture inside of a loop formed in a metal band supported on a rigid base of a piston ring tension measuring apparatus;
    c) horizontally reciprocally moving a section of said band to alternately constrict and relax said loop around said support fixture; and d) vertically reciprocating a portion of said support fixture by selectively and intermittently flowing a medium through a portion of said tension measuring apparatus such that said medium contacts and moves a portion of said support fixture upwardly away from an upper surface of said rigid base.

17. The method of claim 16, wherein said rigid base has a hollow bore formed through a section thereof, said hollow bore terminating at an outlet formed in an upper surface of said rigid base and facing said portion of the support fixture, and wherein said medium is intermittently forced into and through said hollow bore, and outwardly from said outlet toward said portion of the support fixture at a predetermined rate during said step d).

18. The method of claim 16, wherein said support fixture has a hollow bore formed through a section thereof and terminating at an outlet formed in a lower surface of said support fixture and facing said rigid base, and wherein said medium is intermittently forced into and through said hollow bore, and outwardly from said outlet toward said rigid base at a predetermined rate during said step d).

19. The method of claim 16, wherein said medium is compressed air.

20. The apparatus of claim 1, wherein said medium delivery system discharges said medium between said rigid base and said support fixture.

21. The apparatus of claim 1, further including spacer means provided between said rigid base and said portion of said support fixture for creating a small gap when the support fixture is resting on the rigid base.

* * * * *

UNITED STATES PATENT AND TRADEMARK OFFICE
CERTIFICATE OF CORRECTION

PATENT NO. : 6,196,063 B1
DATED : March 6, 2001
INVENTOR(S) : Y. Kasai, Y. Inoue, T. Harris, N. Ebisui, E. Ellington Page 1 of 1

It is certified that error appears in the above-identified patent and that said Letters Patent is hereby corrected as shown below:

Title page,
Under item "[75] Inventors:", correct the residence for "Yasuo Kasai" from "Takanezawa-machi (JP) to -- Tochigi-ken (JP) --; correct the residence for "Yukio Inoue" from "Dublin, OH (US)" to -- Tochigi (JP) --; correct the residence for "Naoki Ebisui" from "Columbus, OH (US)" to -- Tochigi (JP) --; for the item "[73] Assignee", correct "Hogyo" to -- Kogyo --.

Column 1,
Line 65, change "is" to -- are --;
Line 67, change "reprodudcible" to -- reproducible --.

Column 5,
Line 48, change "guage" to -- gauge --;
Line 53, after "painted on" begin a new paragraph with "It will be seen".

Column 7,
Line numbered between 35 and 36, delete "medium".

Column 10,
Line 8, delete "medium".

Signed and Sealed this

Fourth Day of December, 2001

*Attest:*

NICHOLAS P. GODICI
*Attesting Officer*     *Acting Director of the United States Patent and Trademark Office*

UNITED STATES PATENT AND TRADEMARK OFFICE
CERTIFICATE OF CORRECTION

| | | |
|---|---|---|
| PATENT NO. | : 6,196,063 B1 | Page 1 of 1 |
| DATED | : March 6, 2001 | |
| INVENTOR(S) | : Y. Kasai, Y. Inoue, T. Harris, N. Ebisui, E. Ellington | |

It is certified that error appears in the above-identified patent and that said Letters Patent is hereby corrected as shown below:

<u>Title page,</u>
Under item "[75] Inventors:", correct the residence for "Yasuo Kasai" from "takanezawa-machi (JP) to -- Tochigi-ken (JP) --; correct the residence for "Yukio Inoue" from "Dublin, OH (US)" to -- Tochigi (JP) --; correct the residence for "Naoki Ebisui" from "Columbus, OH (US)" to -- Tochigi (JP) --; for the item "[73] Assignee", correct "Hogyo" to -- Kogyo --.

<u>Column 1,</u>
Line 65, change "is" to -- are --;
Line 67, change "reprodudcible" to -- reproducible --.

<u>Column 5,</u>
Line 48, change "guage" to -- gauge --;
Line 53, after "painted on" begin a new paragraph with "It will be seen".

<u>Column 7,</u>
Line numbered between 35 and 36, delete "medium".

<u>Column 10,</u>
Line 8, delete "medium".

This certificate supersedes Certificate of Correction issued December 4, 2001.

Signed and Sealed this

Twentieth Day of August, 2002

*Attest:*

JAMES E. ROGAN
*Director of the United States Patent and Trademark Office*

*Attesting Officer*